United States Patent
Sumizawa et al.

(10) Patent No.: US 7,231,297 B2
(45) Date of Patent: Jun. 12, 2007

(54) NAVIGATION SYSTEM, ABRIDGED MAP DISTRIBUTION APPARATUS AND VEHICLE GUIDING METHOD

(75) Inventors: Akio Sumizawa, Zama (JP); Tomoyo Hayashi, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 166 days.

(21) Appl. No.: 11/071,777

(22) Filed: Mar. 4, 2005

(65) Prior Publication Data

US 2005/0216191 A1 Sep. 29, 2005

(30) Foreign Application Priority Data

Mar. 4, 2004 (JP) .............................. 2004-060632

(51) Int. Cl.
*G08G 1/123* (2006.01)
*G01C 21/26* (2006.01)
(52) U.S. Cl. ................... 701/211; 340/995.21; 342/191
(58) Field of Classification Search ................ 701/211, 701/209, 210; 340/995.19, 995.21; 342/357.01, 342/191, 357.09
See application file for complete search history.

(56) References Cited

U.S. PATENT DOCUMENTS

| | | | |
|---|---|---|---|
| 5,508,931 A | * | 4/1996 | Snider ........................ 701/207 |
| 5,652,706 A | * | 7/1997 | Morimoto et al. ........... 701/210 |
| 6,101,443 A | * | 8/2000 | Kato et al. ................... 701/210 |
| 6,240,363 B1 | * | 5/2001 | Theimer et al. ............. 701/210 |
| 7,054,744 B2 | * | 5/2006 | Hirose et al. ............... 701/210 |

FOREIGN PATENT DOCUMENTS

| | | |
|---|---|---|
| JP | 11-202762 | 7/1999 |
| JP | 2000-346650 | 12/2000 |

* cited by examiner

*Primary Examiner*—Dalena Tran
(74) *Attorney, Agent, or Firm*—Crowell & Moring LLP

(57) ABSTRACT

The navigation system according to the present invention, which guides a subject vehicle to a destination by displaying at a display monitor an arrow indicating the direction of the next turn instead of displaying a map includes a decision-making device that makes a decision as to whether or not the subject vehicle is currently located on a recommended route to a destination set in advance based upon the current position of the subject vehicle, an abridged map generating device that generates an abridged map by abridging a map based upon map data and a display control device that displays at the display monitor the abridged map and the subject vehicle position if the decision-making device determines that the subject vehicle is not currently located on the recommended route.

23 Claims, 12 Drawing Sheets

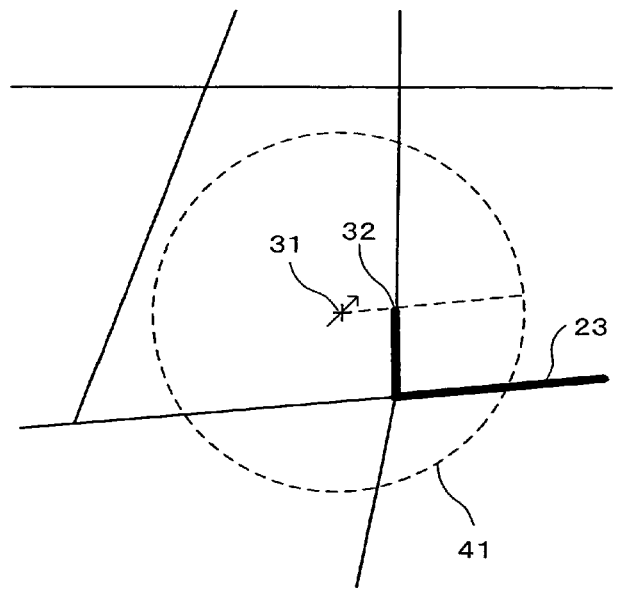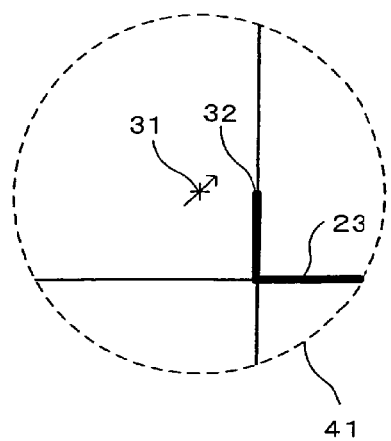
FIG.5A  FIG.5B
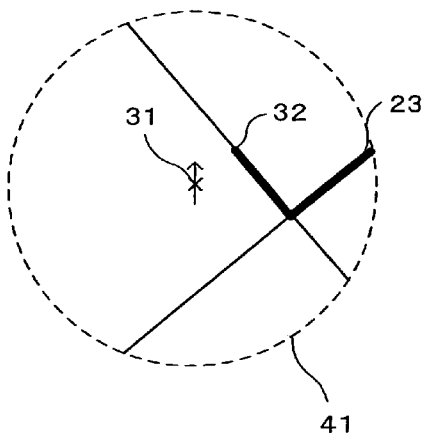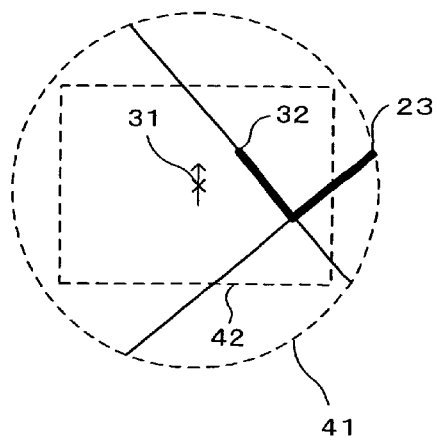
FIG.5C  FIG.5D

NAVIGATION SYSTEM, ABRIDGED MAP DISTRIBUTION APPARATUS AND VEHICLE GUIDING METHOD

INCORPORATION BY REFERENCE

The disclosure of the following priority application is herein incorporated by reference:
Japanese Patent Application No. 2004-60632 filed Mar. 4, 2004

BACKGROUND OF THE INVENTION

1. Field of the Invention

The present invention relates to an apparatus that guides a subject vehicle to a destination and a vehicle guiding method, and more specifically, it relates to an apparatus and a vehicle guiding method, with which guidance is provided by displaying an arrow indicating the direction of the next turn that the vehicle should take instead of displaying a map.

2. Description of Related Art

There are navigation systems known in the related art that guide a vehicle to a destination by indicating the direction of the next turn along a route having been set with an arrow instead of displaying a map. There is a problem with regard to these navigation systems in that when the vehicle is located off the route and cannot be guided along the route, the positional relationship between the route and the vehicle cannot be ascertained. This problem is addressed in the navigation system described in Japanese Patent Application Publication No. 2000-346650 that stores in memory in advance a plurality of pattern diagrams each indicating an approximate positional relationship between the route and the vehicle, calculates the distance to the route and the direction of the route if the vehicle is located off the route and selects and displays the most suitable pattern diagram among the stored pattern diagrams based upon the calculation results. The navigation system thus ascertains the positional relationship between the route and the vehicle.

However, there is a limit to the number of pattern diagrams that can be stored in memory in advance in the navigation system described above. For this reason, there may not always be a pattern diagram that matches a specific route shape or a specific positional relationship between the route and the vehicle, and if the vehicle moves off the route under such circumstances, the positional relationship between the vehicle and the route cannot be indicated in an easy-to-read manner.

SUMMARY OF THE INVENTION

The navigation system according to the present invention, which guides a subject vehicle to a destination by displaying at a display monitor an arrow indicating the direction of the next turn without displaying a map, includes a decision-making device that makes a decision as to whether or not the subject vehicle is currently located on a recommended route to a destination set in advance based upon the current position of the subject vehicle, an abridged map generating device that generates an abridged map by abridging a map based upon map data and a display control device that displays at the display monitor the abridged map and the subject vehicle position if the decision-making device determines that the subject vehicle is not currently located on the recommended route.

The abridged map generating device in the navigation system described above may generate the abridged map by executing linearization processing and orthogonalization processing on road shapes.

It is desirable that the abridged map generating device in the navigation system generates the abridged map over a predetermined map range in reference to the subject vehicle position.

The abridged map generating device in such a navigation system may generate the abridged map over a map range determined based upon the subject vehicle position and a specific geographic point on the recommended route selected in correspondence to the subject vehicle position.

In addition, it is desirable that the abridged map generating device in the navigation system described above generates the abridged map over a circular map range around the subject vehicle position over a radius extending over a length determined based upon the distance from the subject vehicle position to the specific geographic point.

In the navigation system, the abridged map generating device may select a point on a route-search eligible road that is the closest to the subject vehicle position as the specific geographic point.

Alternately, in the navigation system, the abridged map generating device may select a point on the recommended route last traveled by the subject vehicle as the specific geographic point.

The display control device in the navigation system may rotate the abridged map so that the subject vehicle heading direction is oriented upward and display the abridged map at the display monitor.

In addition, it is desirable that the display control device in the navigation system updates the subject vehicle position on the abridged map so that the subject vehicle position continues to be displayed with the abridged map at the display monitor until the subject vehicle moves onto the recommended route.

The abridged map distribution apparatus according to the present invention generates an abridged map and distributes the abridged map to a navigation system which guides a subject vehicle to a destination by displaying an arrow indicating the direction of the next turn instead of displaying a map at a display monitor, and includes an abridged map generating device that generates an abridged map by abridging a map based upon map data if the abridged map distribution apparatus receives from the navigation system that the subject vehicle is not currently located on a recommended route and an abridged map distributing device that distributes the abridged map generated by the abridged map generating device to the navigation system.

The vehicle guiding method according to the present invention through which a subject vehicle is guided to a destination by displaying an arrow indicating the direction of the next turn instead of displaying a map, includes steps for making a decision as to whether or not the subject vehicle is currently located on a recommended route to a destination set in advance based upon the current position of the subject vehicle, generating an abridged map by abridging a map based upon map data if the subject vehicle is determined to be located off the recommended route and displaying the abridged map with the subject vehicle position.

BRIEF DESCRIPTION OF THE DRAWINGS

FIGS. 5A to 5D illustrate the specific details of the processing executed in steps S2 through S5;

DESCRIPTION OF THE PREFERRED EMBODIMENT

Figure 1:
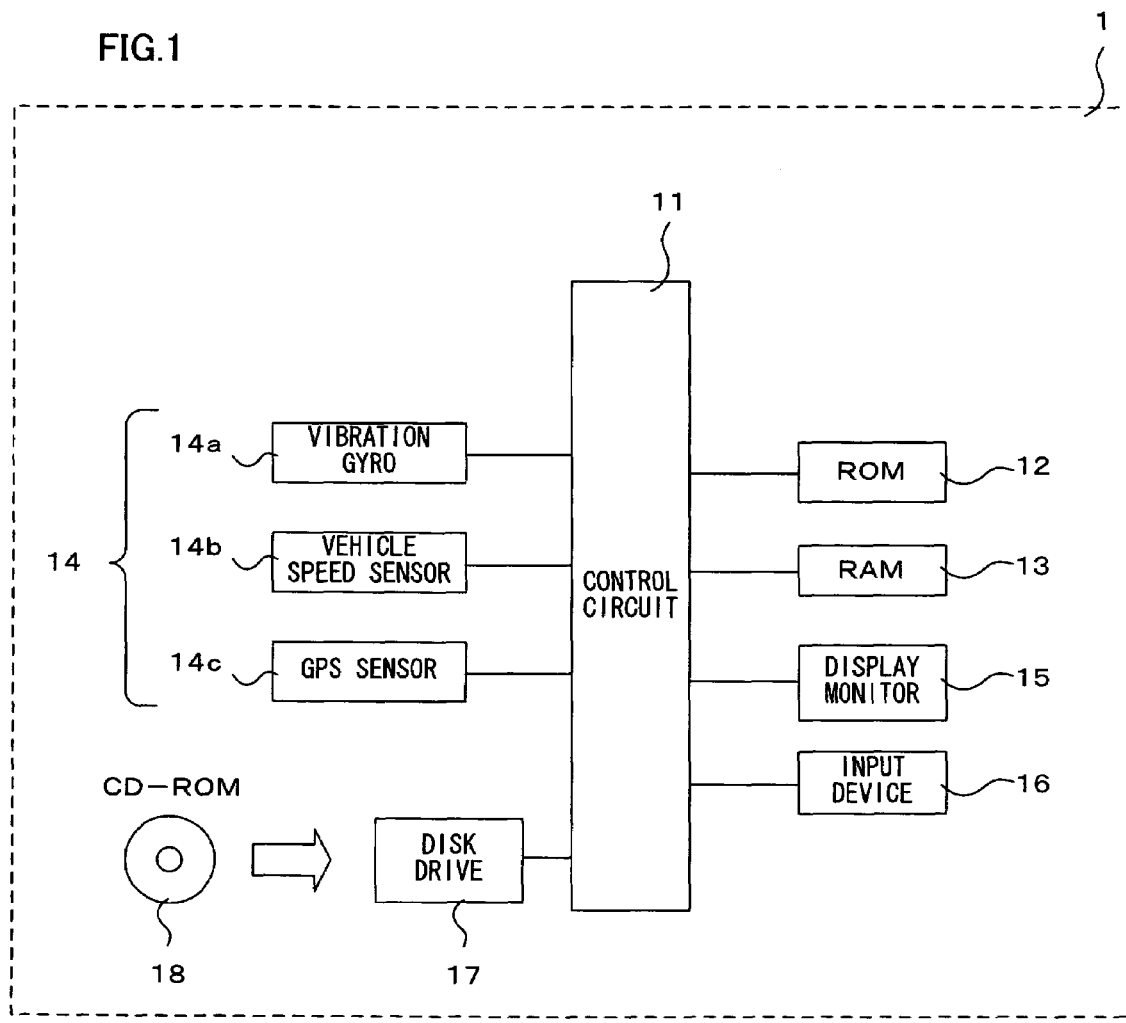
FIG. 1 is a block diagram of the structure adopted in the navigation system achieved in an embodiment of the present invention.

FIG. 1 shows the structure adopted in the navigation system achieved in an embodiment of the present invention. This navigation system, which is installed in a vehicle, guides the subject vehicle to the destination by displaying an arrow indicating the direction of the next turn to the user instead of displaying a map. This type of the navigation system is normally referred to as a turn-by-turn (TBT) navigation system. In addition, if the vehicle is located off the route, the navigation system displays an abridged map obtained by simplifying road shapes in the regular map so as to indicate the positional relationship between the subject vehicle and the route. The navigation system 1 in FIG. 1 includes a control circuit 11, a ROM 12, a RAM 13, a current position detection device 14, a display monitor 15, an input device 16 and a disk drive 17. A CD-ROM 18 having recorded therein map data is loaded into the disk drive 17.

The control circuit 11 constituted with a microprocessor and its peripheral circuits uses the RAM 13 as its work area when executing a control program stored in the ROM 12 to implement various types of processing and control. As the control circuit 11 executes the processing to be detailed later based upon the map data recorded in the CD-ROM 18, various types of display including the arrow and the abridged map mentioned above are brought up at the display monitor 15.

The current position detection device 14, which detects the current position of the subject vehicle, may comprise, for instance, a vibration gyro 14a that detects the advancing direction of the subject vehicle, a vehicle speed sensor 14b that detects the vehicle speed, a GPS sensor 14c that detects a GPS signal transmitted from a GPS satellite and the like. Based upon the current position of the subject vehicle detected by the current position detection device 14, the navigation system 1 determines the route search start point and the like, and is also able to detect whether or not the subject vehicle is located off the route.

At the display monitor 15, the arrow and the abridged map used for guidance as described above are displayed under control implemented by the control circuit 11. It is to be noted that the display monitor 15 in the embodiment may be achieved by using a less expensive display device with lower resolution and fewer display colors compared to the display device included in a navigation system that guides the subject vehicle by displaying a regular map (hereafter referred to as a map display navigation system). Namely, while the map display navigation system requires, for instance, a full-color high-resolution display device in order to accurately display the map, the display device in the embodiment may be constituted by using, for instance, a monochrome, low-resolution display device. For this reason, a navigation system that is less expensive than the map display navigation system can be provided by adopting the embodiment.

The input device 16 includes various types of input switches through which the user sets a destination and waypoints (hereafter simply and collectively referred to as a destination), and may be an operation panel or a remote-control device. By operating the input device 16, the user is able to set a destination by specifying its address, its geographical name or the like.

The disk drive 17 reads out map data from the CD-ROM 18 loaded therein. The map data include route calculation data used to calculate a recommended route to the destination, route guidance data indicating intersection names, road names and the like and used to guide the subject vehicle to the destination along the recommended route, and road data expressing roads. Unlike map data used in a standard map display navigation system, the map data recorded in the CD-ROM 18 do not need to include background data, drawing data and the like used to display a regular map.

The smallest unit representing a road portion in the road data is referred to as a link and each road is constituted with a plurality of links. A point at which links connect with each other is referred to as a node, and position information (coordinate information) is provided in correspondence to each node. Based upon the position information corresponding to the individual nodes, the link shapes, i.e., specific road shapes, are determined. By executing streamline processing to be detailed later on such road data, an abridged map is generated. Information (link type information) related to a road type is set in correspondence to each link. In addition, while the map data are read out from the CD-ROM in this example, the map data may instead be read out from a recording medium other than a CD-ROM, e.g., a DVD-ROM or a hard disk.

Once the user sets the destination, the navigation system 1 determines through an arithmetic operation the route to the destination by setting the current position (subject vehicle position) detected by the current position detection device 14 as a route search start point and using a specific algorithm based upon the route calculation data mentioned earlier. It is to be noted that if the subject vehicle position is not on a route-search eligible road, e.g., if the subject vehicle is currently located inside a large parking lot or the like, the geographic point on a route search-eligible road closest to the subject vehicle position is set as the route search start point. Then, the subject vehicle is guided to the destination along the recommended route thus determined by displaying an arrow indicating the direction of the next turn to take at the display monitor 15 and by displaying an abridged map indicating the positional relationship of the subject vehicle to the recommended route if the subject vehicle moves off the recommended route.

Figure 2:
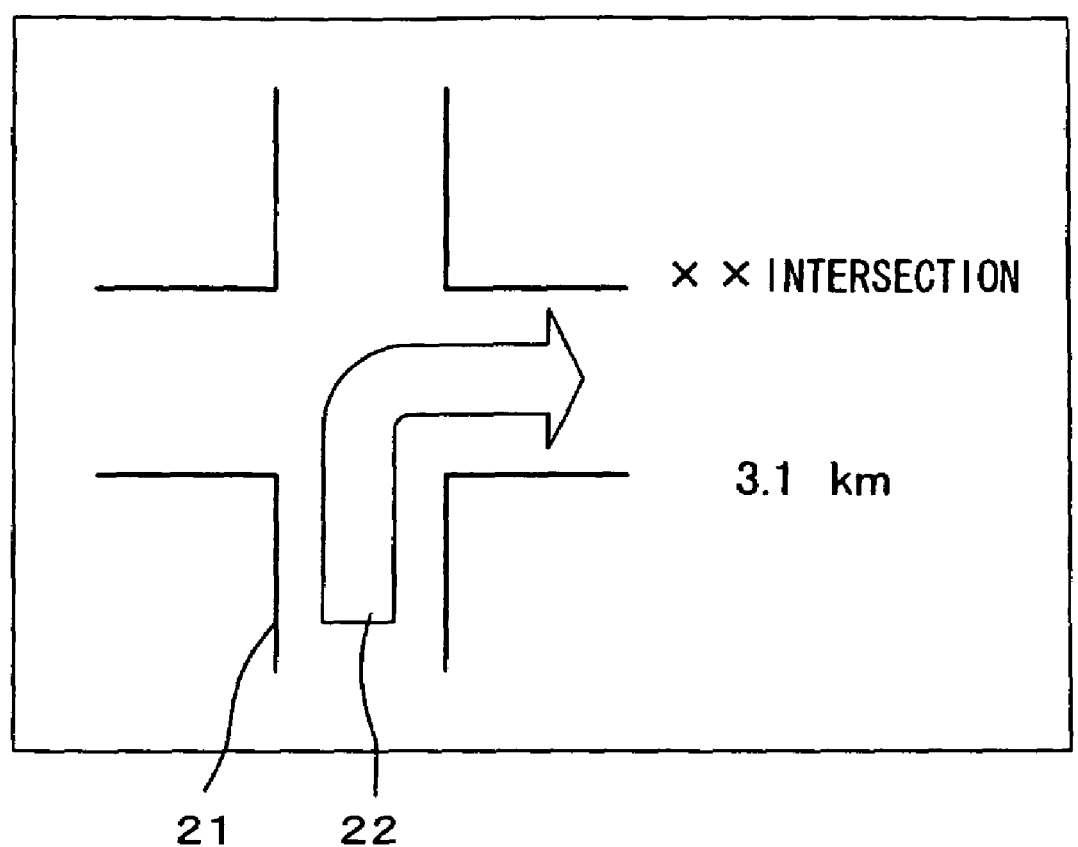
FIG. 2 presents an example of an arrow display indicating the direction of the next turn along the recommended route.

FIG. 2 presents an example of an arrow display indicating the direction of the next turn that the vehicle traveling along the recommended route should take. In this example, the name of the intersection or the branching point (hereafter referred to as a guidance requiring intersection) at which the vehicle should take the turn and the distance from the current position of the subject vehicle to the intersection are displayed in addition to an arrow 22 displayed over a simple intersection shape 21. The display provides instructions for the user indicating the direction of the turn to take at the next guidance requiring intersection. It is to be noted that a road name or the like may be displayed instead of the intersection name, and that audio guidance or the like may be provided as well.

Figure 3:
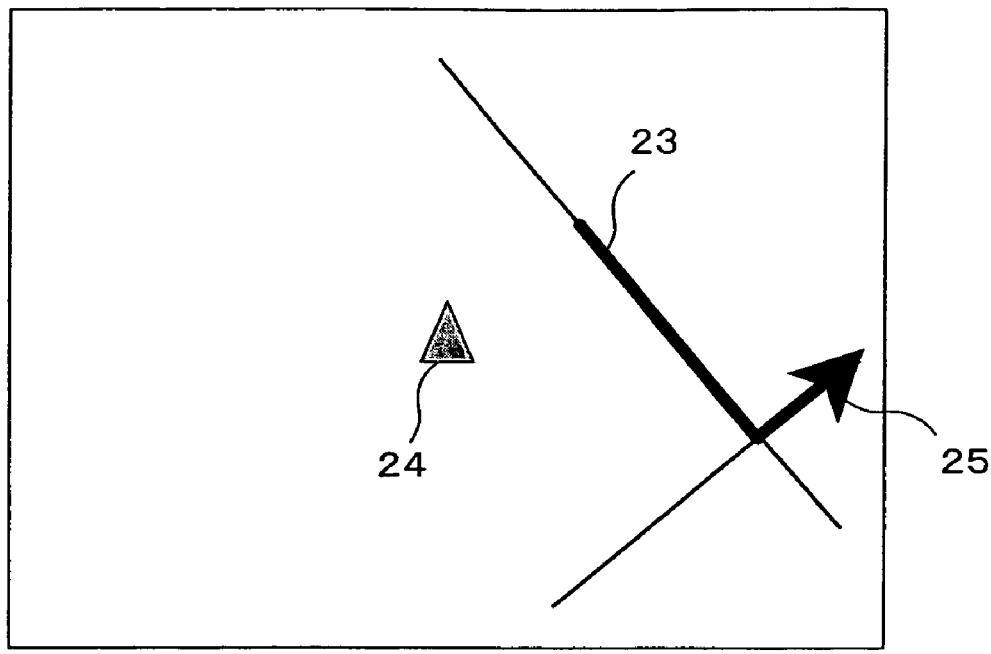
FIGS. 3A and 3B present an example of an abridged map display indicating the positional relationship between the subject vehicle located off the recommended route and the recommended route.
Figure 3:
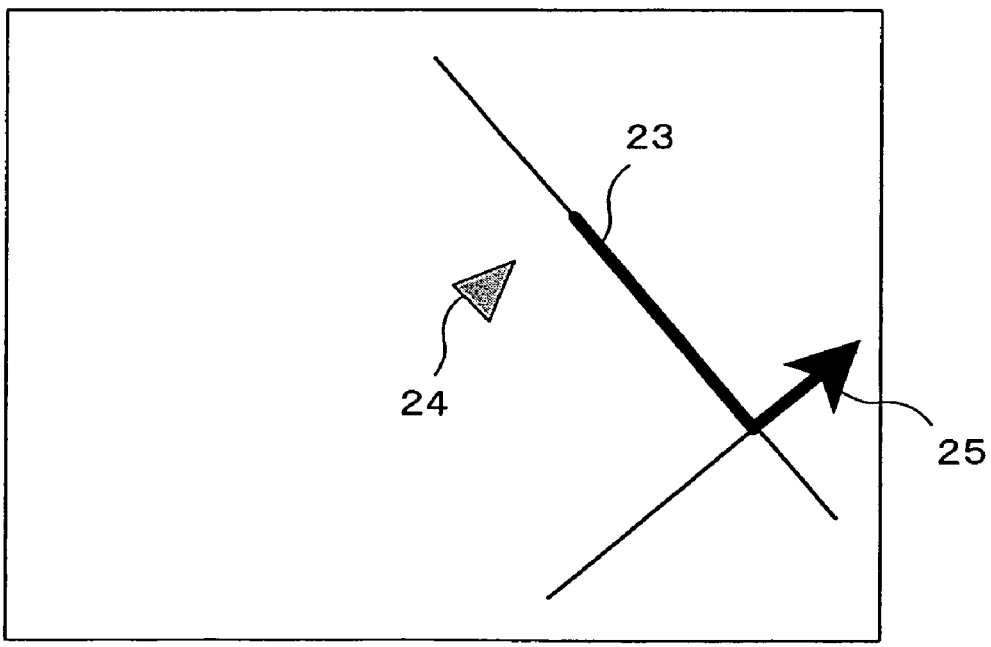

FIGS. 3A and 3B present an example of an abridged map display indicating the positional relationship of the subject vehicle located off the recommended route to the recommended route. In this example, an abridged map along a recommended route 23 indicated with the bold line in the figure is displayed. In addition, the positional relationship of the subject vehicle to the recommended route is indicated by displaying a subject vehicle position mark 24 and an advancing direction mark 25. The position at which the subject vehicle position mark 24 is displayed on the screen changes as the subject vehicle travels on. For instance, the initial screen display in FIG. 3A may change to the display in FIG. 3B as the subject vehicle moves closer to the recommended route. It is to be noted that the method adopted to generate the abridged map based upon the map data recorded in the CD-ROM 18 is explained next in reference to the flowchart.

Figure 4:
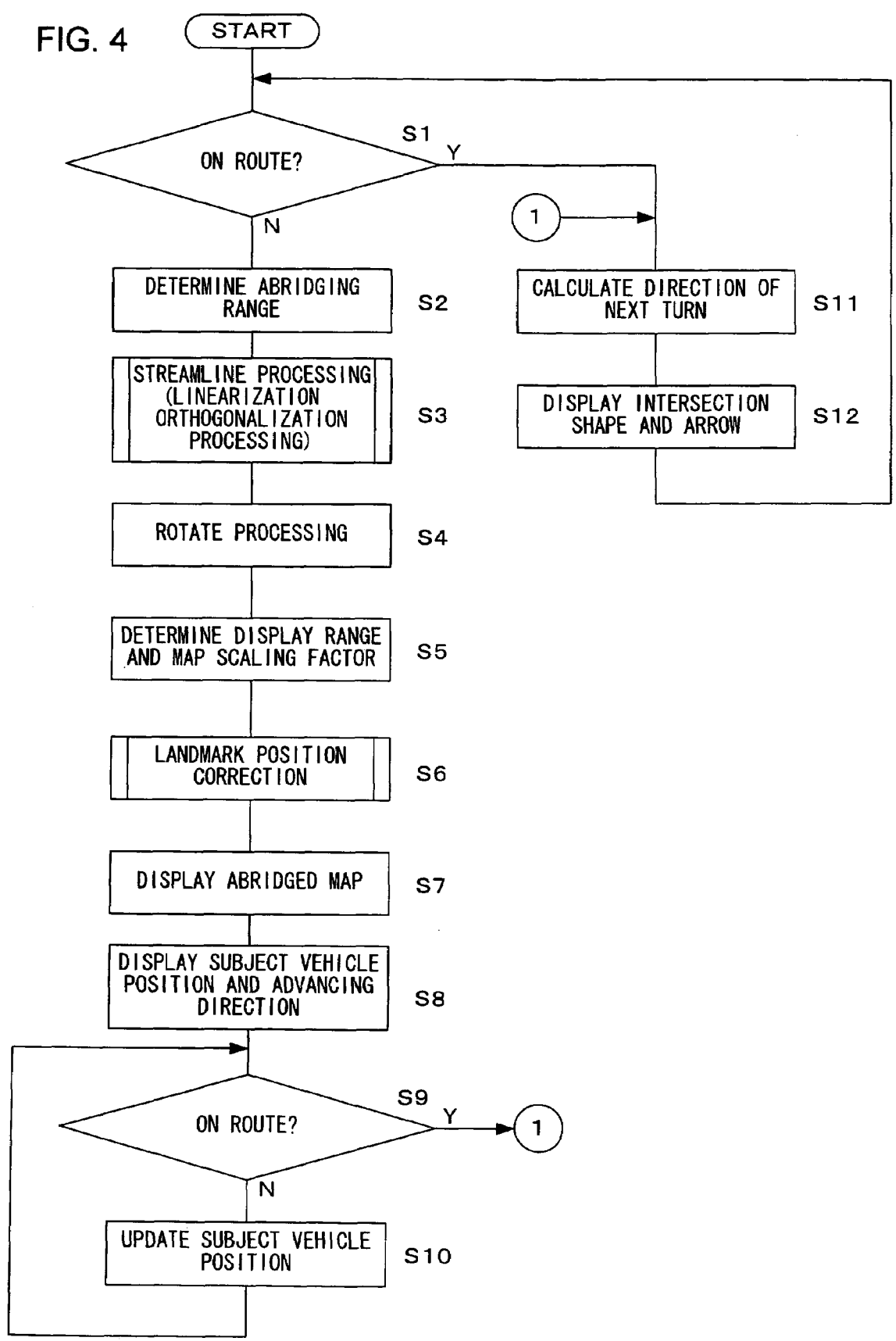
FIG. 4 presents a flowchart of the processing executed to guide the subject vehicle to the destination.

FIG. 4 presents a flowchart of the processing executed by the control circuit 11 when guiding the subject vehicle to the destination. It is to be noted that the recommended route to the destination is already set as explained earlier before the processing in the flowchart starts.

In step S1, a decision is made as to whether or not the subject vehicle is currently located on the recommended route. The subject vehicle may be determined to be located off the recommended route if a route search has been executed inside a large parking length of time, as mentioned earlier, or if the traveling vehicle has moved off the recommended route or the like. The operation proceeds to step S11 if it is decided in step S1 that the subject vehicle is located on the recommended route, whereas the operation proceeds to step S2 if the subject vehicle is determined to be located off the recommended route. The decision is made in step S1 by comparing the coordinates of the subject vehicle position detected by the current position detection device 14 with the coordinates of the individual links present on the recommended route in the map data.

It is to be noted that conventionally, the smallest unit representing a single road portion in map data is a link, and that individual roads are constituted with a plurality of links. The coordinates and the shape of each link are determined by nodes and shape interpolation points in correspondence to which position information (coordinate information) is provided. Links are connected with one another at nodes, and a single shape interpolation point or a plurality of shape interpolation points may be set in a single link in order to indicate the road shape accurately.

The processing executed when the operation proceeds from step S1 to step S2 is first explained. In step S2, the abridging range, i.e., the map range over which the abridged map is to be generated, is determined. In this example, the abridging range is set over a circular area of a predetermined size, ranging around the subject vehicle position. The radius of the circular abridging range is determined in correspondence to the distance between the subject vehicle position and a specific geographic point on the recommended route and may be set to, for instance, a value obtained by multiplying the distance by 3. It is to be noted that the specific geographic point on the recommended route is the route search start point, i.e., a point closest from the subject vehicle position on a route search-eligible road, if the subject vehicle has never been on the recommended route (e.g., if a route search has been executed within a large parking lot, as described above). If, on the other hand, the vehicle has moved off the recommended route while traveling, the point on the recommended route last traveled by the vehicle is selected as the specific geographic point.

In step S3, an abridged map is generated by executing streamline processing (linearization and orthogonalization processing) on the individual roads (links) contained in the abridging range determined in step S2. The streamline processing is to be explained in detail later. In step S4, the entire abridged map generated through the streamline processing executed in step S3 is rotated around the center thereof, i.e., around the subject vehicle position, so as to orient the direction of the subject vehicle to the upward direction on the display. As a result, as the subject vehicle advances directly upward in the abridged map on display, a user friendly display is achieved.

In step S5, the display range and the map scaling factor at which the abridged map rotated in step S4 is to be displayed at the display monitor 15 are determined. The display range should be smaller than, at least, the abridging range set in step S2. The display range and the map scaling factor should be determined also by ensuring that the size of the abridged map to be displayed matches the size of the screen at the display monitor 15. It is to be noted that the largest possible display range satisfying the requirements outlined above should be set.

Details of the processing executed in step S2 through S5 as described above are to be explained in more specific terms later in reference to FIGS. 5A to 5D.

In step S6, the positions of landmarks in the abridged map are corrected. The landmark position correction is to be explained in detail later.

In step S7, the abridged map generated as described above is displayed at the display monitor 15 over the display range and at the map scaling factor having been determined in step S5. In step S8, the subject vehicle position mark and the advancing direction mark are displayed on the abridged map brought up on display in step S7. After indicating the positional relationship between the subject vehicle and the recommended route by displaying the abridged map such as in FIG. 3A or FIG. 3B in step S8 as explained above, the operation proceeds to the next step S9.

In step S9, a decision is made as to whether or not the subject vehicle is now traveling on the recommended route. This decision may be made in a manner similar to that with which the decision in step S1 is made, by detecting the current position of the subject vehicle with the current position detection device 14. The operation proceeds to step S11 if the vehicle is judged to be traveling on the recommended route, whereas the operation proceeds to step S 10 if the vehicle is judged to be still off the recommended route.

In step S10, the display position of the subject vehicle position mark brought up on display on the abridged map in step S8 is updated in correspondence to the current position of the subject vehicle used in the decision-making executed in step S9. Once the processing in step S10 is executed, the operation returns to step S9 to repeatedly execute the processing described above. The subject vehicle position is updated as described above on the abridged map on display until the vehicle moves onto the recommended route.

Next, the processing executed when the operation proceeds to step S11 is explained. As has already been explained, the operation proceeds to step S11 if the subject vehicle is determined to be traveling on the recommended route in step S1 or if the subject vehicle is determined to have moved onto the recommended route in step S9. In other words, the subject vehicle is invariably traveling on the recommended route when step S11 is executed. In step S11, the direction of the next turn to take along this recommended route is calculated by calculating the angle at which the links on the recommended route intersect each other at the next guidance requiring intersection. At this time, the shape of the guidance requiring intersection, too, is ascertained through calculation.

In step S12, an arrow indicating the direction of the next turn and the shape of the corresponding guidance requiring intersection, both having been calculated in step S11, are displayed at the display monitor 15. Thus, a screen display such as that shown in FIG. 2 is brought up to indicate the direction of the turn to take at the next guidance requiring intersection for the user. Once the processing in step S12 is executed, the operation returns to step S1 to repeatedly execute the processing described above. By bringing up the screen display shown in FIG. 2, FIG. 3A or FIG. 3B as described above, the subject vehicle is guided along the recommended route having been set.

FIGS. 5A to 5D illustrate specific details of the processing executed in steps S2 through S5. FIG. 5A shows how the abridging range is determined in step S2. It is assumed that the subject vehicle, the position 31 of which is not on a route-search eligible road, is currently oriented along the direction indicated with the arrow. As a route search is executed in this state, a recommended route 23 is ascertained through the search with a geographic point 32 closest to the subject vehicle point 31 on a route-search eligible road set as the route search start point. In this case, an abridging range 41 over a circular area around the subject vehicle position 31 ranging over a radius that is three times the distance between the subject vehicle position 31 and the route search start point 32 as explained earlier is determined in step S2.

The abridged map shown in FIG. 5B is generated by executing in step S3 the streamline processing on the individual roads inside the abridging range 41 thus determined. The streamline processing is to be explained in detail next. In step S4, the abridged map in FIG. 5B is rotated around the subject vehicle position 31 to orient the subject vehicle direction (the pointed end of the arrow) upward, as shown in FIG. 5C. Then, in step S5, a display range 42 is set inside the abridging range 41. After executing the landmark position correction in step S6 for the abridged map contained in the display range 42, the resulting abridged map is displayed in step S7, and then the abridged map is displayed as shown in FIG. 3A with the subject vehicle position mark 21 and the advancing direction mark 25 brought up on display in step S8.

Next, the streamline processing executed in step S3 is explained in detail. FIGS. 6A to 6E and 7A to 7H illustrate in detail the streamline processing executed to generate the abridged map according to the present invention. In reference to FIGS. 6A to 6E, streamline processing (1) through which the shape of a road is linearized (the data of the make-up points constituting the road are culled) is explained.

Figure 6A:
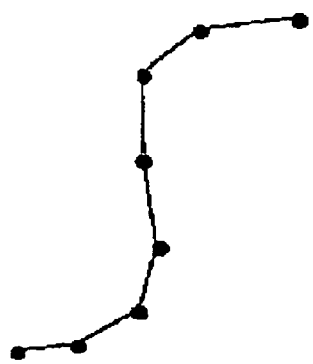
FIGS. 6A to 6E illustrate the streamline processing (1) executed to generate an abridged map.
Figure 6B:
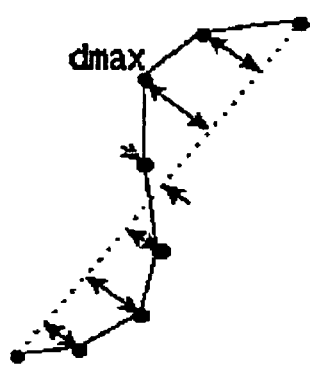
Figure 6C:
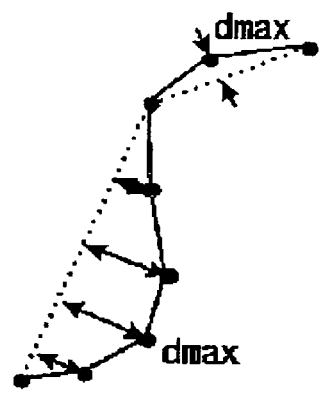
Figure 6D:
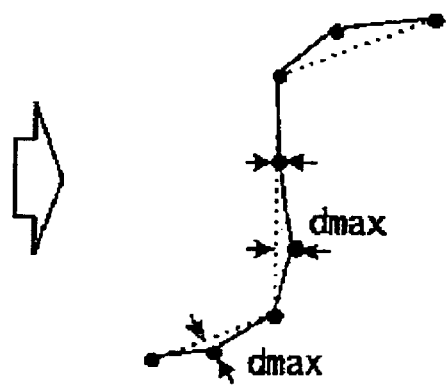

Lets us now assume that the shape of the actual road is as indicated in FIG. 6A. The lengths of the perpendiculars connecting the individual points with the line (the dotted line) that connects the two end points (referred to as the first end point and the second end point) are measured and the largest perpendicular length dmax among them is determined. Then, if dmax thus ascertained is determined to be equal to or greater than a predetermined value setting $\epsilon$ (if dmax$\geq\epsilon$), the corresponding make-up point is retained. Namely, as shown in FIG. 6C, the point corresponding to dmax is added as a new end point (to be referred to as a third end point) and lines connecting the first end point with the third end point and the third end point with the second end point are drawn as indicated with the dotted lines. It is to be noted that the "points" or "make-up points" as referred to in this context determine the shape of a given road, i.e., a given link string, and are equivalent to nodes or shape interpolation points in the road data explained earlier.

Figure 6E:
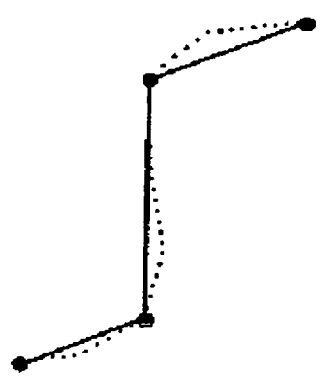

Processing similar to that described above is repeatedly executed until the largest perpendicular length dmax becomes smaller than $\epsilon$. In the state shown in FIG. 6D, dmax is smaller than $\epsilon$. At this time, the shape of the road is indicated with the straight lines connecting end points closest to each other. As a result, the road shape shown in FIG. 6E is achieved. Through this processing, the shape of the road is linearized.

Figure 7A:
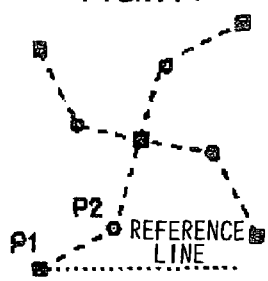
FIGS. 7A to 7H illustrate the streamline processing (2) also executed to generate an abridged map.
Figure 7B:
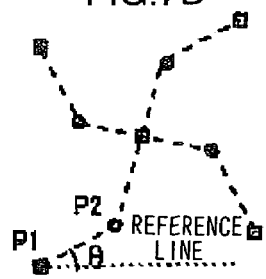

FIGS. 7A to 7H shows streamline processing (2) through which the shapes of roads are orthogonalized. Assuming that the shapes of the actual roads are as shown in FIG. 7A, a straight line extending parallel to the x-axis (the horizontal direction in the map), which passes through a first point (P1) in the first polygonal line, is determined. This straight line indicated with the dotted line in the figure is used as a reference line. Next, as shown in FIG. 7B, the angle $\theta$ formed by the vector (link) P1P2 connecting the point P1 and the next point P2 relative to the reference line is determined.

Figure 7C:
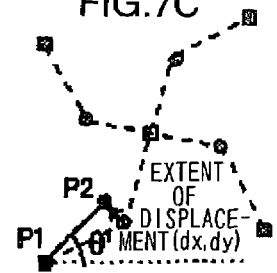

Next, as shown in FIG. 7C, the vector P1P2 is rotated around the start point P1 so that $\theta'=n\cdot\Delta\theta$ (n is an integer) when the vector length is fixed. As a result, the end point P2 becomes displaced. It is to be noted that the angle $\Delta\theta$ is the unit angle representing the increments with which the vector P1P2 is rotated and may be, for instance, 45°. Through this processing, the angle formed by the vector P1P2 and the reference line is corrected in the increments of the unit angle $\Delta\theta$.

Figure 7D:
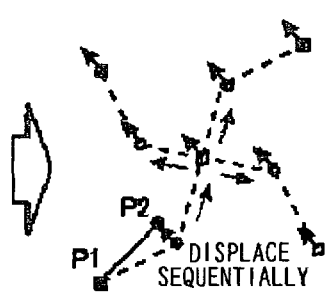

Then, as illustrated in FIG. 7D, beyond the point P2, the displacement of points is propagated by an extent matching the displacement (dx, dy) of the point P2. During this process, an intersection is displaced to branch points. Thus, the positions of the other points are displaced through propagation of the displacement.

Figure 7E:
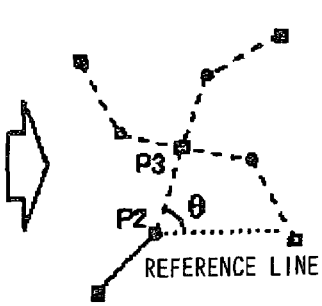
Figure 7F:
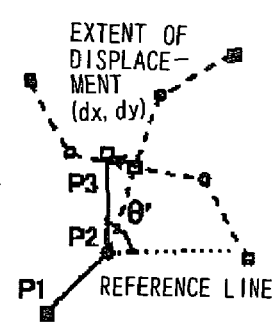
Figure 7G:
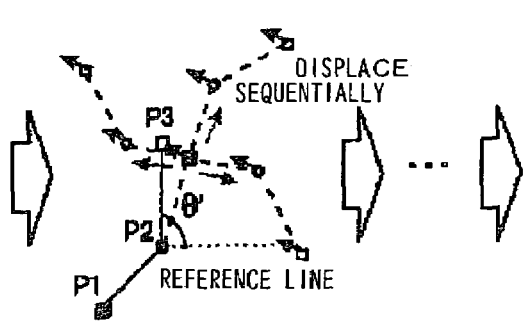

Subsequently, processing similar to that described above is repeatedly executed. Namely, as shown in FIG. 7E, a straight line passing through the point P2 and running parallel to the x-axis is designated as a reference line and the angle $\theta$ formed by the next vector P2P3 and the reference line is determined. Then, as shown in FIG. 7F, the vector P2P3 is rotated around the start point P2 so that $\theta'$ becomes equal to $n\cdot\Delta\theta$, and thus, the end point P3 is displaced. Subsequently, as illustrated in FIG. 7G, the displacement of points is propagated beyond the point P3 by an extent matching the displacement (dx, dy) of the point P3. During this process, an intersection is displaced to branch points.

Figure 7H:
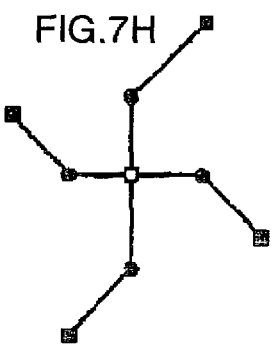

As the processing described above is executed for all the points in sequence by repeating similar operations, the road shapes shown in FIG. 7H are ultimately achieved. Through the processing, the road shapes are orthogonalized. Once the road shapes are linearized and orthogonalized as described above, the streamline processing ends. The abridged map is created by executing the streamline processing over the map range having been set.

On the abridged map generated as described above, landmarks indicating the positions of various types of facilities are displayed as in the original, pre-streamline map. However, as the road shapes are simplified through the streamline processing, the positions of the roads in the abridged map become different from their positions in the original map. For this reason, the landmarks displayed at the original positions on the abridged map would not indicate the correct positional relationships between the roads and the landmarks. Accordingly, it is necessary to correct the landmark positions after the streamline processing. The following is an explanation of the method adopted to execute the landmark position correction.

Figure 8A:
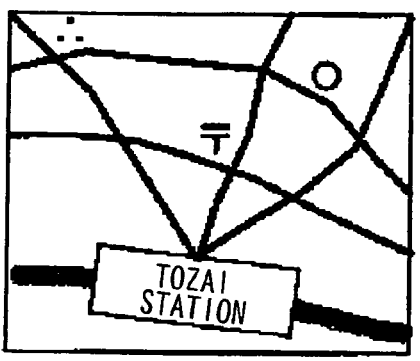
FIGS. 8A to 8C outline the landmark position correction.
Figure 8B:
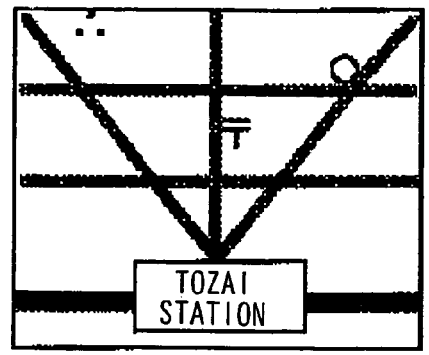
Figure 8C:
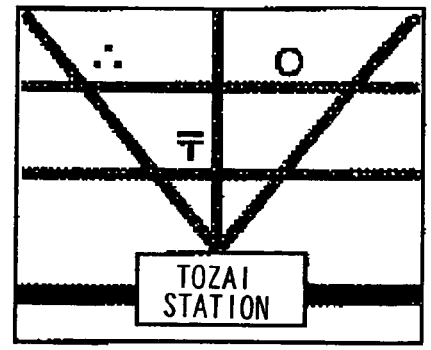

FIGS. 8A to 8C outline the landmark position correction executed in step S6. As shown in FIG. 8A, subtle positional relationships between the landmark positions and the roads are reflected in the map prior to the streamline processing. Namely, the landmark positions that may assume any angles in the detailed map indicate subtle positional relationships of the landmark positions to the roads. When the streamline processing (shape data streamlining) explained earlier is executed on this original map and the original positions of the landmarks are displayed on the streamlined map without any correction, the resulting abridged map may be as shown in FIG. 8B.

In the abridged map shown in FIG. 8B, only the road positions are altered from their positions in the original map in FIG. 8A and the actual positional relationships between the landmarks and the roads are not correctly reflected. Namely, since the landmark positions still do not reflect the positions indicated in the streamlined shape data, the position of a landmark is shown on the side of the road opposite from the side where it is situated on the original map, for instance. More specifically, the position of the post office located around the center of the map is indicated in the abridged map in FIG. 8B on the side of the road opposite from the side on which it is indicated in the original map in FIG. 8A. As the means for addressing this problem, the landmark position correction is executed to approximate the positional relationships between the roads and the landmarks in the abridged map to the positional relationships in the original map, as shown in FIG. 8C.

Figure 9:
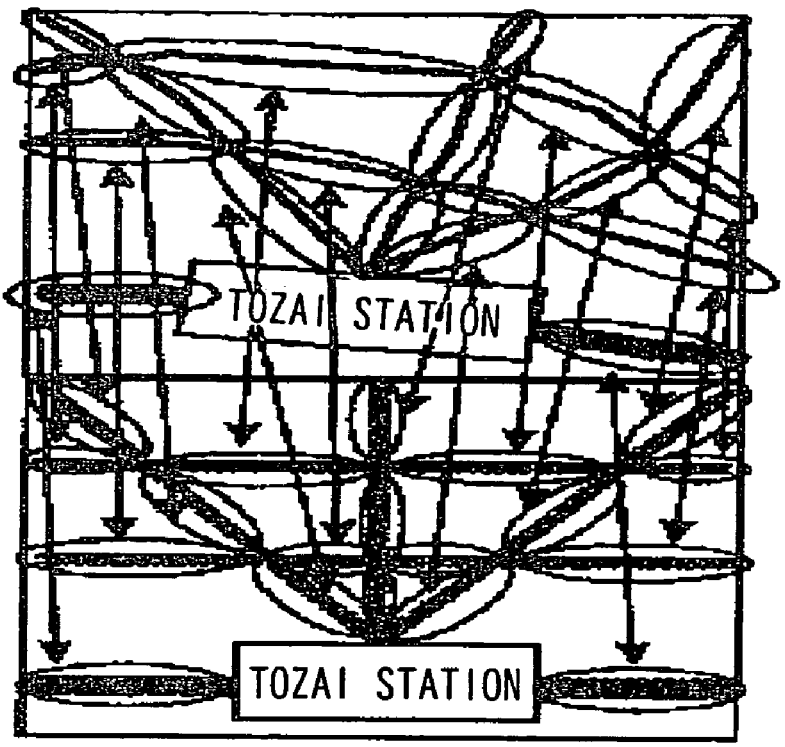
FIGS. 9A and 9B illustrate the detail algorithm used in the landmark position correction.
Figure 9B:
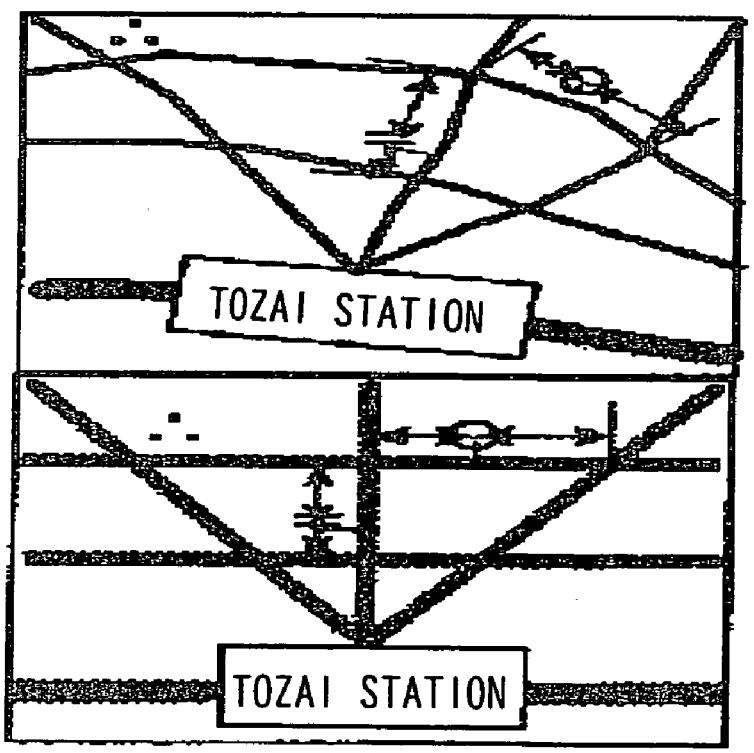

Next, in reference to FIGS. 9A to 9C, the detail algorithm used in the landmark position correction is explained. In the landmark position correction, a pair list of pairs of shape vectors, each pair made up of a pre-abridge shape vector and a corresponding post-abridge shape vector, is created as shown in FIG. 9A. When the streamline processing explained earlier is executed to abridge the original map, the number of make-up points constituting each shape vector indicating a road shape changes from the initial number. Accordingly, when compiling the pair list, it is necessary to ensure that the directionalities of the branching point in the shape vectors corresponding to each other and constituting a pair in the pair list match. In other words, it is necessary to ensure that a one-on-one correlation is achieved with regard to the positions of the corresponding branching points in the pre-streamline vector and the post-streamline vector.

Once the pair list is compiled as described above, correction processing is executed to equalize the ratios of the norms of the individual shape vectors in the pair to the corresponding distances to the branching points, as shown in FIG. 9B. Namely, the ratios of the norm value of the shape vector closest to each landmark and the distances between the landmark and the corresponding branching points along the route containing the shape vector in the pre-abridge original map are measured. Based upon these measured values, the position of the landmark on the abridged map having undergone the streamline processing is calculated so as to equalize the ratios of the norm value of the corresponding shape vector in the pair list and the distances from the landmark to the individual branching points to the ratios in the original map. Finally, the landmark is displayed at the position thus calculated.

Since the shapes of the roads and the distances indicated in the abridged map obtained by executing the streamline processing on the regular map become different, it is necessary to convert the coordinates of the relevant landmarks (stores located along the roads, etc.) in conformance to the changes in the road shapes and the distances, as part of the landmark position correction. Accordingly, positional parameters with regard to the position of each landmark prior to the conversion, e.g., the position of the landmark prior to the conversion expressed as a percentage from one end of the road (link), the side of the road on which the landmark is located and the distance indicating how far off the road the landmark is located, are determined. Then, the post-conversion landmark position in the corresponding road data having undergone the conversion is determined by using these three parameters. This process is now explained in reference to the specific example presented in FIGS. 10A and 10B.

Figure 10:
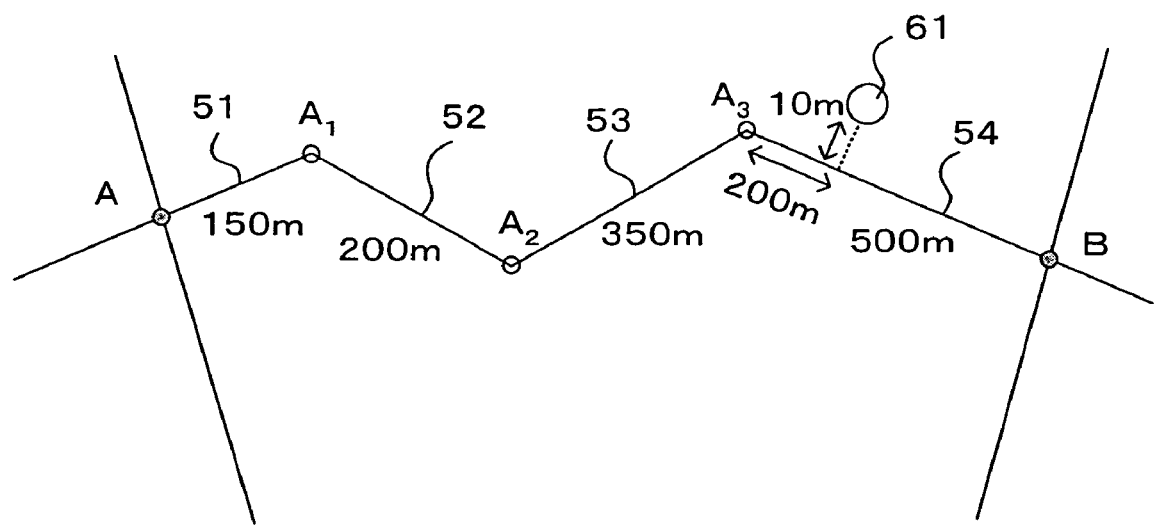
FIGS. 10A and 10B present a specific example of the landmark position correction.
Figure 10:
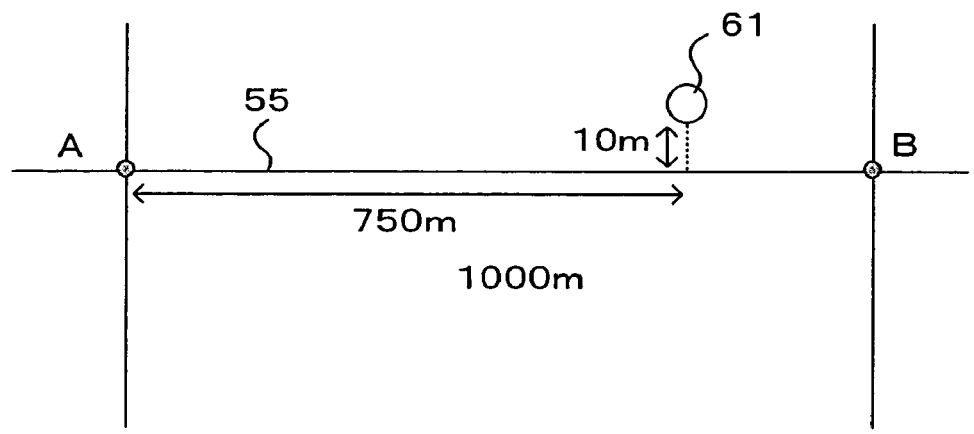

FIG. 10A presents an example of a landmark position in a regular map that has not undergone the streamline processing. The road connecting a point A and a point B is constituted with a link 51 extending between the point A and a point A1, a link 52 extending between the point A1 and a point A2, a link 53 extending between the point A2 and a point A3 and a link 54 extending between the point A3 and the point B, and a landmark 61 is present along the road. The lengths of the links 51 to 54 are respectively 150 m, 200 m, 350 m and 500 m, and the road connecting the points A and B thus has a length which is the sum, i.e., 1200 m, of the lengths of the individual links constituting the road. The landmark 61 is located at a point 200 m measured from the point A3 toward the point B, i.e., at a point 900 m measured from the point A, on the left side of the road. In addition, the landmark 61 is located at a position distanced from the road by 10 m.

The three parameters explained earlier are determined with regard to the pre-streamline landmark position. The first parameter, i.e., the ratio of the distance to the landmark from one end of the road (from the point A) to the entire distance is 900/1200=0.75 (75%). The second parameter, i.e., the side of the road on which the landmark is located, is determined to be the left side of the road heading toward the point B from the point A. The third parameter, i.e., the distance indicating how far the landmark is off the road, is determined to be 10 m.

FIG. 10B presents an example of the landmark position in the abridged map obtained by executing the streamline processing. In this abridged map, the road connecting the point A and the point B is indicated with a single link 55 the length of which is 1000 m. When displaying the landmark 61 on this abridged map, the converted position of the landmark is determined based upon the three parameters having been obtained as described above. Namely, the distance from the point A is calculated to be 1000×0.75=750 m based upon the first parameter. In addition, based upon the second parameter and the third parameter, the position of the landmark is determined to be at the point located on the left side of the road (the link 55) viewed from the point A and distanced from the road by 10 m. The position of the landmark 61 is corrected as the landmark 61 is displayed at the position satisfying these requirements.

Through the processing explained above, the individual landmarks are indicated at corrected positions in the abridged map and the positional relationships between the roads and the landmarks are approximated to those in the unabridged original map. Thus, the landmark positions in the original map shown in FIG. 8A are displayed at the positions shown in FIG. 8C in the abridged map. With the corrected landmark positions indicated on the map obtained through the streamline processing as described above, the abridged map is created.

The following advantages are achieved in the embodiment described above.

(1) A decision is made as to whether or not the subject vehicle is currently located on the recommended route (step S1), an abridged map is generated if the subject vehicle is determined to be off the recommended route (step S3), and the abridged map and the subject vehicle position are displayed at the display monitor 15 (steps S7 and S8). As a result, if the subject vehicle is off the recommended route, the positional relationship of the subject vehicle to the recommended route can be clearly indicated on a TBT navigation system using an inexpensive display device with a lower resolution and fewer display colors compared to the display device used in a map display navigation system.

(2) Since the abridged map is generated by linearizing and orthogonalizing the road shapes (step S2), an abridged map showing simplified road shapes, which is ideal for display on an inexpensive display device, can be generated with ease.

(3) An abridging range is set over a circular map area ranging around the subject vehicle position over a radius determined in correspondence to the distance between the subject vehicle position and a specific geographic point on the recommended route (step S2), and the abridged map is generated over this abridging range. During this process, a point on a route-search eligible road closest to the subject vehicle position or a point on the recommended route last traveled by the subject vehicle is set as the specific geographic point. As a result, an abridged map clearly indicating the positional relationship of the subject vehicle to the recommended route can be generated.

(4) Since the abridged map is rotated to orient the direction of the subject vehicle to the upward direction on the display (step S4), a user-friendly display can be achieved.

(5) The subject vehicle position is updated on the abridged map kept on display until the subject vehicle moves onto the recommended route (steps S9, S10), and thus, while the subject vehicle is off the recommended route, the positional relationship between the subject vehicle and the recommended route, which changes constantly as the subject vehicle travels, can be clearly indicated.

It is to be noted that an explanation is given above in reference to the embodiment on an example in which the abridging range is set over a circular area around the subject vehicle position ranging over a radius determined in correspondence to the distance between the subject vehicle position and a specific geographic point on the recommended route. Instead, the abridging range may be determined based upon the subject vehicle position and a specific point on the recommended route by adopting a method other than that described above. For instance, the abridging range may be set over an elliptical area, the convergent points thereof set at the subject vehicle position and the specific point on the recommended route. Alternatively, a specific abridging range may be determined in reference to the subject vehicle position alone. For instance, the size of the abridging range may be set in advance, and a range with this specific size around the subject vehicle position may be set as the abridging range. In addition, the specific point on the recommended route is not limited to those explained in reference to the embodiment, and it may instead be, for instance, the next guidance requiring intersection.

While an explanation is given above in reference to the embodiment on an example in which an abridged map is generated in the navigation system by reading out map data from a storage medium such as a CD-ROM when the subject vehicle is determined to be not present on the recommended route, the present invention is not limited to this example. For instance, the present invention may be adopted in a communication navigation system that downloads map data from an information distribution center through wireless communication achieved via a portable telephone or the like. In such an application, if it is determined in the navigation system that the subject vehicle is not currently located on the recommended route, the navigation system may inform the information distribution center that the subject vehicle is off the recommended route, the abridged map generation processing described above may then be executed at the information distribution center in response, and the processing result may be subsequently transmitted from the information distribution center to the navigation system. Namely, the information distribution center in such an application should include an apparatus that generates an abridged map in response to a notification issued by a navigation system and an apparatus that transmits the abridged map to the navigation system.

Figure 11:
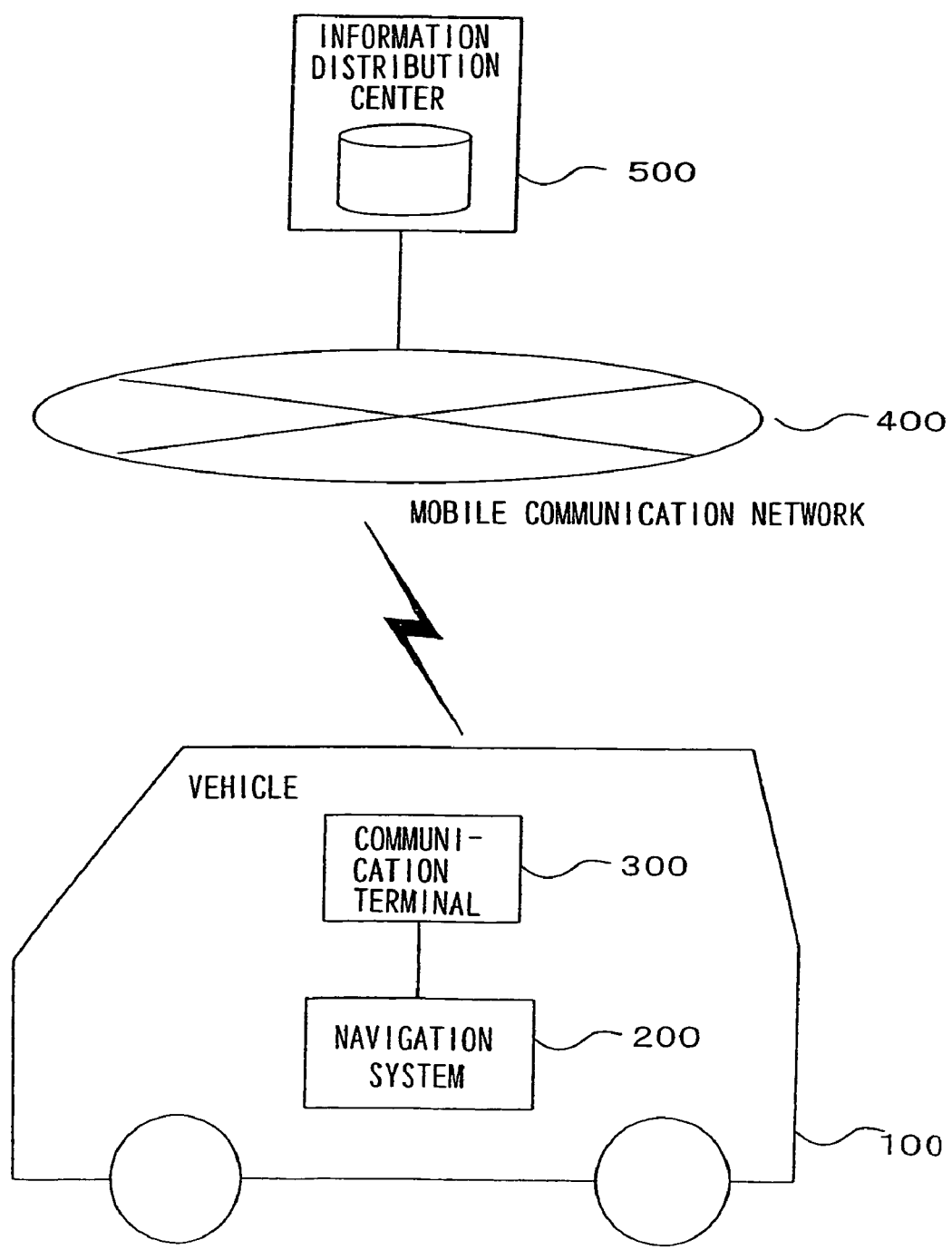
FIG. 11 shows how the present invention may be adopted in conjunction with a communication navigation system.

FIG. 11 shows the configuration of such an application. A navigation system 200 installed in a vehicle 100 is connected with a communication terminal 300. The communication terminal 300 may be, for instance, a portable telephone. The communication terminal 300 is wirelessly connected with a mobile communication network 400. An information distribution center 500 is connected with the mobile communication network 400. Namely, the navigation system 200 is connected to the information distribution center 500 via the communication terminal 300 and the mobile communication network 400. If the vehicle 100 is not located on the recommended route, the navigation system 200 transmits a report to the information distribution center 500. In response to the report, the information distribution center 500 executes the processing explained in detail earlier and transmits the resulting map data to the navigation system 200. The navigation system 200 receives the map data transmitted from the information distribution center 500 via the mobile communication network 400 and the communication terminal 300. The present invention may be adopted effectively in such a communication navigation system as well.

It is to be noted that when the present invention is adopted in conjunction with a personal computer or the like, the program used to implement the control described above may be provided in a recording medium such as a CD-ROM or via an electric communication network such as the Internet.

Figure 12:
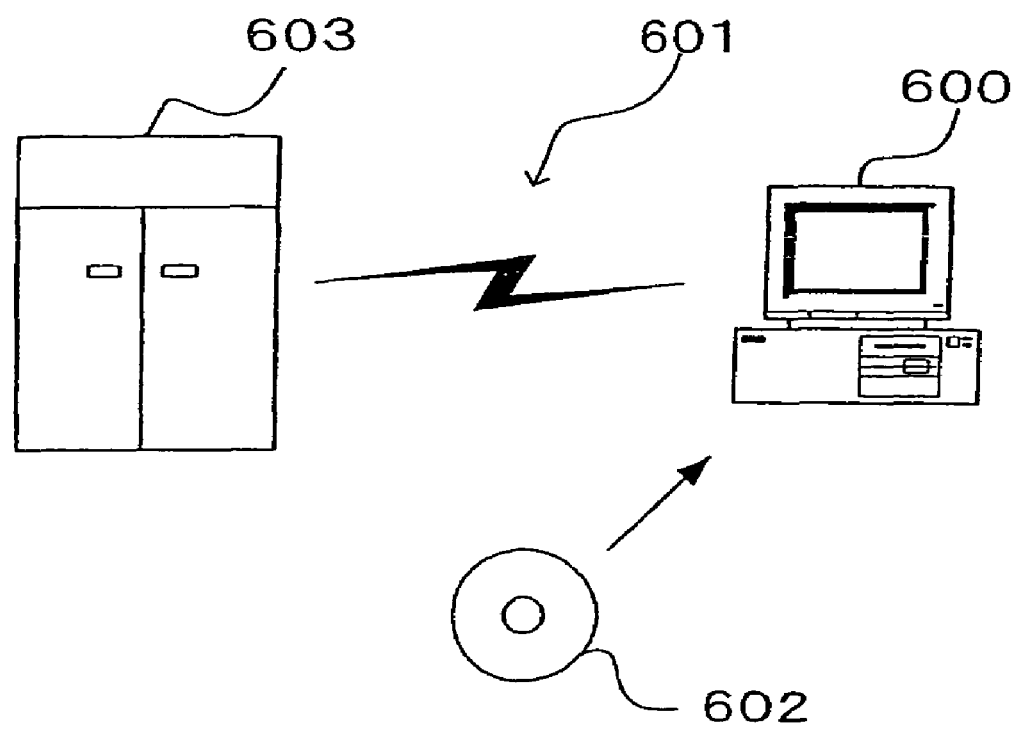
FIG. 12 shows how the present invention may be adopted in conjunction with a personal computer.

FIG. 12 shows the configuration that may be adopted in such an application. A personal computer 600 obtains the program via a CD-ROM 602. In addition, the personal computer 600, which can be connected with a communication line 601, may obtain the program from a server 603. The communication line 601 may be a communication line for Internet communication, personal computer communication or the like, or it may be a dedicated communication line. The server 603 transmits the program to the personal computer 600 via the communication line 601. In other words, the program is converted to data signals transmitted on a carrier wave and the data signals resulting from the conversion are transmitted via the communication line 601. As described above, the program may be distributed as a computer-readable computer program product adopting any of various modes including a recording medium and a carrier wave.

The present invention is not limited to the embodiment described above and other modes that are conceivable within the technical field of the present invention are included within the scope of the present invention.

What is claimed is:

1. A navigation system that guides a subject vehicle to a destination by displaying at a display monitor an arrow indicating a direction of a next turn without displaying a map, comprising:
    a decision-making device that makes a decision as to whether or not the subject vehicle is currently located on a recommended route to a destination set in advance based upon a current position of the subject vehicle;
    an abridged map generating device that generates an abridged map by abridging a map based upon map data; and
    a display control device that displays at the display monitor the abridged map and the subject vehicle position if the decision-making device determines that the subject vehicle is not currently located on the recommended route.

2. A navigation system according to claim 1, wherein:
    the abridged map generating device generates the abridged map by executing linearization processing and orthogonalization processing on road shapes.

3. A navigation system according to claim 2, wherein:
    the abridged map generating device generates the abridged map over a predetermined map range in reference to the subject vehicle position.

4. A navigation system according to claim 3, wherein:
    the abridged map generating device generates the abridged map over a map range determined based upon the subject vehicle position and a specific geographic point on the recommended route selected in correspondence to the subject vehicle position.

5. A navigation system according to claim 4, wherein:
    the abridged map generating device generates the abridged map over a circular map range around the subject vehicle position over a radius extending over a length determined based upon a distance from the subject vehicle position to the specific geographic point.

6. A navigation system according to claim 5, wherein:
    the abridged map generating device selects a point on a route-search eligible road that is closest to the subject vehicle position as the specific geographic point.

7. A navigation system according to claim 5, wherein:
    the abridged map generating device selects a point on the recommended route last traveled by the subject vehicle as the specific geographic point.

8. A navigation system according to claim 4, wherein:
    the abridged map generating device selects a point on a route-search eligible road that is closest to the subject vehicle position as the specific geographic point.

9. A navigation system according to claim 4, wherein:
    the abridged map generating device selects a point on the recommended route last traveled by the subject vehicle as the specific geographic point.

10. A navigation system according to claim 1, wherein:
    the abridged map generating device generates the abridged map over a predetermined map range in reference to the subject vehicle position.

11. A navigation system according to claim 10, wherein:
    the abridged map generating device generates the abridged map over a map range determined based upon the subject vehicle position and a specific geographic point on the recommended route selected in correspondence to the subject vehicle position.

12. A navigation system according to claim 11, wherein:
    the abridged map generating device generates the abridged map over a circular map range around the subject vehicle position over a radius extending over a length determined based upon a distance from the subject vehicle position to the specific geographic point.

13. A navigation system according to claim 12, wherein:
    the abridged map generating device selects a point on a route-search eligible road that is closest to the subject vehicle position as the specific geographic point.

14. A navigation system according to claim 12, wherein:
    the abridged map generating device selects a point on the recommended route last traveled by the subject vehicle as the specific geographic point.

15. A navigation system according to claim 11, wherein:
    the abridged map generating device selects a point on a route-search eligible road that is closest to the subject vehicle position as the specific geographic point.

16. A navigation system according to claim 11, wherein:
    the abridged map generating device selects a point on the recommended route last traveled by the subject vehicle as the specific geographic point.

17. A navigation system according to claim 1, wherein:
    the display control device rotates the abridged map so that the subject vehicle heading direction is oriented upward and displays the abridged map at the display monitor.

18. A navigation system according to claim 1, wherein:
    the display control device updates the subject vehicle position on the abridged map so that the subject vehicle position continues to be displayed with the abridged map at the display monitor until the subject vehicle moves onto the recommended route.

19. An abridged map distribution apparatus that generates an abridged map and distributes the abridged map to a navigation system that guides a subject vehicle to a destination by displaying at a display monitor an arrow indicating a direction of a next turn instead of displaying a map, comprising:
    an abridged map generating device that generates an abridged map by abridging a map based upon map data if the abridged map distribution apparatus receives from the navigation system that the subject vehicle is not currently located on a recommended route; and
    an abridged map distributing device that distributes the abridged map generated by the abridged map generating device to the navigation system.

20. A vehicle guiding method through which a subject vehicle is guided to a destination by displaying an arrow indicating a direction of a next turn instead of displaying a map, comprising:

making a decision as to whether or not the subject vehicle is currently located on a recommended route to a destination set in advance based upon a current position of the subject vehicle;

generating an abridged map by abridging a map based upon map data if the subject vehicle is determined to be located off the recommended route; and displaying the abridged map with the subject vehicle position.

21. A navigation system that guides a subject vehicle to a destination by displaying at a display monitor an arrow indicating a direction of a next turn without displaying a map, comprising:

a decision-making device that makes a decision as to whether or not the subject vehicle is currently located on a recommended route to a destination set in advance based upon a current position of the subject vehicle;

an abridged map generating device that generates an abridged map to indicate a positional relationship between the subject vehicle and the recommended route by abridging a map based upon map data; and a display control device that displays at the display monitor the abridged map and the subject vehicle position if the decision-making device determines that the subject vehicle is not currently located on the recommended route.

22. An abridged map distribution apparatus that generates an abridged map and distributes the abridged map to a navigation system that guides a subject vehicle to a destination by displaying at a display monitor an arrow indicating a direction of a next turn instead of displaying a map, comprising:

an abridged map generating device that generates an abridged map to indicate a positional relationship between the subject vehicle and a recommended route by abridging a map based upon map data if the abridged map distribution apparatus receives from the navigation system that the subject vehicle is not currently located on a recommended route; and an abridged map distributing device that distributes the abridged map generated by the abridged map generating device to the navigation system.

23. A vehicle guiding method through which a subject vehicle is guided to a destination by displaying an arrow indicating a direction of a next turn instead of displaying a map, comprising:

making a decision as to whether or not the subject vehicle is currently located on a recommended route to a destination set in advance based upon a current position of the subject vehicle;

generating an abridged map to indicate a positional relationship between the subject vehicle and a recommended route by abridging a map based upon map data if the subject vehicle is determined to be located off the recommended route; and displaying the abridged map with the subject vehicle position.

\* \* \* \* \*